Figure 1:
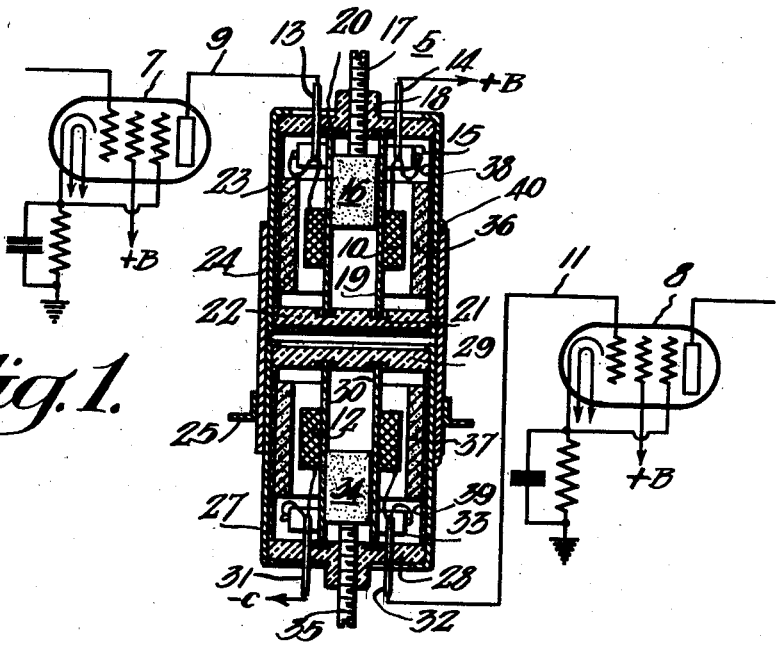

Dec. 5, 1944.   R. L. HARVEY   2,364,291
INTERMEDIATE FREQUENCY TRANSFORMER
Filed Oct. 30, 1940

Inventor
Robert L. Harvey
By
Attorney

Patented Dec. 5, 1944

2,364,291

UNITED STATES PATENT OFFICE 2,364,291

INTERMEDIATE FREQUENCY TRANSFORMER

Robert L. Harvey, Collingswood, N. J., assignor to Radio Corporation of America, a corporation of Delaware Application October 30, 1940, Serial No. 363,538

5 Claims. (Cl. 171—119)

This invention relates to intermediate frequency transformers and has for its primary object to provide such a transformer which is (1) variably tunable by means of movable magnetic core elements without appreciably changing the coupling relation between the transformer windings, and (2) provided with means for adjusting or determining the coupling relation between said windings without appreciably varying the tuning of said windings.

It is a further object of the present invention to provide an improved coupling transformer for intermediate frequency signal circuits and the like, which provides the adjustment features above referred to with a high degree of stability and which is at the same time compact and readily manufactured at low cost.

The invention will, however, be further understood from the following description when considered in connection with the accompanying drawing and its scope is pointed out in the appended claims.

Figure 2:
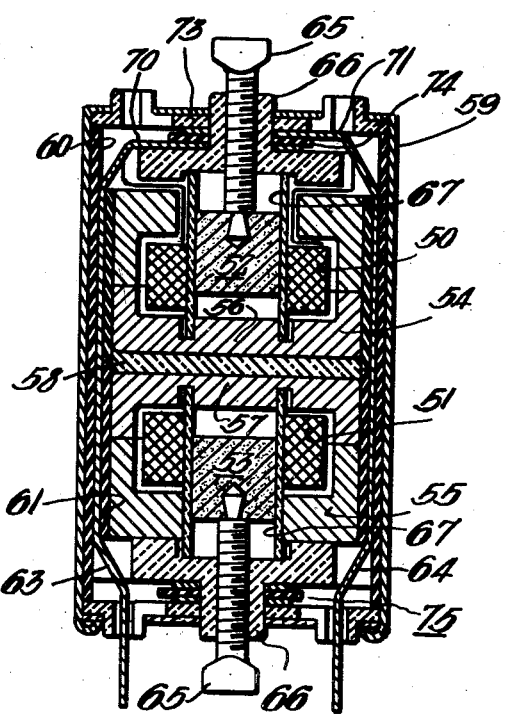

In the drawing,

Figure 1 is a view partly in cross-section of a transformer embodying the invention and connected in circuit as an interstage amplifier coupling device, and Figure 2 is a similar cross-sectional view of a transformer also embodying the invention, as a modification of the device shown in Fig. 1.

Referring to Fig. 1, the transformer 5 may be considered as an interstage coupling transformer for an intermediate frequency amplifier connected between a first stage 7 and a second stage 8. The output circuit 9 of the first stage 7 includes a multilayer solenoid coupling winding or primary 10 while the input or grid circuit 11 of the stage 8 includes a second multilayer solenoid coupling winding or secondary 12.

The primary 10 is connected to input terminals 13 and 14 as indicated, across which there may be connected a suitable fixed tuning capacitor 15 for resonating the winding 10 as a tunable inductance within a predetermined frequency range within which it is accurately tuned by an axially movable magnetic core member 16. The core 16 is movable into and out of the winding by suitable means such as a threaded rod or adjustment screw 17 carried by a supporting end member 18 at one end of the transformer. The winding 10 is supported by an insulating tubular coil form 19 maintained centrally of the transformer in suitable recesses at one end in the member 18 as indicated at 20 and in corresponding recesses 21 in a similar supporting end member on the opposite end of the coil as indicated at 22.

The members 18 and 22 are supported in spaced relation to each other by a metallic casing 23 forming an outer electrostatic shield for the winding and this, in turn, is slidably mounted in a tubular bracket 24 provided with mounting means 25 by which it may be attached to any suitable supporting means.

The secondary 12 is similarly mounted in a slidable unit comprising a similar metallic outer casing 27 having spacing and supporting end members 28 and 29 for the insulating coil form 30 extending between them. Output terminals 31 and 32 for the secondary are provided in the end member 28 and said terminals are connected to a suitable tuning capacitor 33 also effective to tune the secondary within the operating frequency range of the circuits with which the transformer is used. The final tuning is accomplished as in the case of the primary, by means of a movable magnetic core member 34 having an adjusting screw 35 supported by the end member 28.

The coupling windings 10 and 12 are provided with radially outer core members 36 and 37 of magnetic material which are preferably annular members fixed in relation to the windings but relatively adjustable axially one with respect to the other. The outer cores are insulated from the outer casings 23 and 27 by layers of insulating material 38 and 39 forming a lining for the casings 23 and 27 and from the inner cores 16 and 34 by the coil forms 19 and 30.

It will be noted that the outer core members 36 and 37, the coils 10 and 12 and the inner cores 16 and 34 are all arranged in coaxial relation to each other and that said coils and inner core elements are more widely spaced from each other in an axial direction than the outer core members 36 and 37; that is, the latter members are more closely spaced than the windings 10 and 12 or the tuning cores 16 and 34. By so arranging said elements, the tuning cores 16 and 34 may be moved to tune the windings effectively without appreciably changing the coupling between the windings as determined by the relative positions or spacing of the outer core elements 36 and 37.

In order to adjust this relation to provide a predetermined or optimum coupling between the primary and secondary windings of the transformer unit, the primary unit 23 and the secondary unit 27 are relatively movable in the supporting bracket 24 and when adjusted for proper coupling may be secured in position, one relative to the other, by means of solder or other securing means as indicated at 40 to lock the outer casings 23 and 27 to the bracket or sleeve 24.

In operation, the outer core members 36 and 37 are more closely spaced, one with respect to the other, at all times than the inner cores 16 and 34 for determining the coupling between the windings, whereby the inner cores may be adjusted substantially without changing the coupling relation established by adjustment of the outer cores.

Referring now to Fig. 2, a modification of the construction shown in Fig. 1 comprising the transformer coils or windings 50 and 51 are each provided with inner movable tuning cores, as indicated at 52 and 53, and annular outer cores, as shown at 54 and 55. The latter are constructed substantially to surround a major portion of the winding and to form a closure for the adjacent ends of the windings as indicated at 56 and 57. The spacing between the cores 54 and 55 is determined by the thickness of an insulating disc 58 located between the two winding units. This is made in production to provide a desired coupling between the windings 50 and 51. Thus, in the present embodiment, the outer cores are depended upon for determining and providing the coupling between the two windings and are therefore more closely spaced than either the windings or the inner movable tuning cores.

In the present example, the outer cores, as well as the inner cores, are insulated from an outer shield container or casing 59 by cylindrical insulating sleeves 60 and 61 between which the terminal conductors 63 and 64 are secured. The movable cores are supported on threaded adjustment screws 65 mounted in insulating and supporting members 66 at each end of the transformer. This may be of any suitable insulating material.

The cores 52 and 53 are preferably of molded iron powder with a suitable binder while the outer cores 54 and 55 preferably contain a larger percentage of insulating binder.

It will be noted that all of the core elements are insulated, one from the other, thereby cutting down conductive current paths through the core structure and to reduce capacity effects or stray capacity in shunt with the windings. As in the preceding embodiment, the coil forms 67 for the primary and secondary are of suitable insulating material.

The tuning capacitors for the windings are provided by including the conductive end members 70 and 71 of the terminals 63 and 64 between the supporting member 66 and an insulating end plate 73 with a washer 74 of dielectric material between them. A similar capacitor arrangement is provided at 75 at the opposite end of the transformer for tuning the winding 51, the terminals of which are at right angles to those shown in the drawing, and hence do not appear. However, as the details of construction do not concern the present invention, further description is not believed to be necessary.

I claim as my invention:

1. A coupling transformer for high frequency circuits, comprising a pair of coaxial spaced solenoid windings, an inner axially movable tuning core of magnetic material for each of said windings, means providing radially outer coaxial cores of magnetic material for said windings, at least a portion of each of said outer cores providing appreciable magnetic leakage for coupling to the other of said outer cores, and said outer cores being relatively axially adjustable and being more closely spaced at all times, one with respect to the other, than the inner tuning cores and windings for determining the degree of coupling between said windings and said windings being more closely spaced than said inner cores.

2. A coupling transformer for tuned high frequency circuits comprising a pair of tunable inductance windings in coaxial spaced relation to each other, an inner axially movable tuning core of magnetic material for each of said windings, means providing a radially outer core surrounding each of said windings in axially spaced relation to each other, at least a portion of each of said outer cores providing appreciable magnetic leakage for coupling to the other of said outer cores, and said outer cores being relatively axially adjustable and being more closely spaced at all times than the inner tuning cores and said windings for determining the degree of coupling between said windings and said windings being more closely spaced than said inner cores, a metallic shield casing surrounding said windings and cores, and means for insulating said cores and casing one from another.

3. A transformer for coupling tuned high frequency circuits which comprises a pair of coupling windings in coaxial spaced relation to each other, means providing an inner movable tuning core of magnetic material for each of said windings, means providing outer core members of magnetic material surrounding each of said windings in axially spaced relation to each other, at least a portion of each of said outer cores providing appreciable magnetic leakage for coupling to the other of said outer cores, and said outer core members being relatively axially adjustable and being more closely spaced at all times than the inner tuning cores, for determining the degree of coupling between said windings, and said windings being more closely spaced than said inner cores and said inner tuning cores being thereby adjustable substantially without changing the coupling relation between said windings as determined by adjustment of the outer core means.

4. A coupling transformer for high frequency circuits comprising a pair of coupling windings mounted in coaxial spaced relation to each other, means providing inner coaxial adjustable cores of magnetic material for each of said windings, an outer annular core of magnetic material surrounding each of said windings, at least a portion of each of said outer cores providing appreciable magnetic leakage for coupling to the other of said outer cores, and means for axially spacing said outer cores to determine the degree of coupling between said windings, the axial spacing between the outer cores being less than the axial spacing between the windings and between the inner cores and said windings being more closely spaced than said inner cores.

5. A coupling transformer for high frequency circuits comprising a pair of coupling windings mounted in coaxial spaced relation to each other, means providing inner movable coaxial cores of magnetic material for each of said windings, an outer annular core of magnetic material surrounding each of said windings at least adjacent ends of said outer cores being closed, and at least said closed core portions providing appreciable magnetic leakage for coupling to the other of said closed core portions, means for axially spacing said closed ends of said outer cores to determine the degree of coupling between said windings, and said windings being more closely spaced than said inner cores and said inner cores and windings being at all times more widely spaced than said outer cores, whereby the tuning of said windings by adjustment of said inner cores may be effected substantially without changing the coupling relation between said windings as established by adjustment of the outer cores.

ROBERT L. HARVEY.